April 15, 1958     J. M. FOGELBERG     2,830,911
METHOD OF DEOXYGENATING POTATO GRANULES AND THE LIKE
Filed Aug. 3, 1955
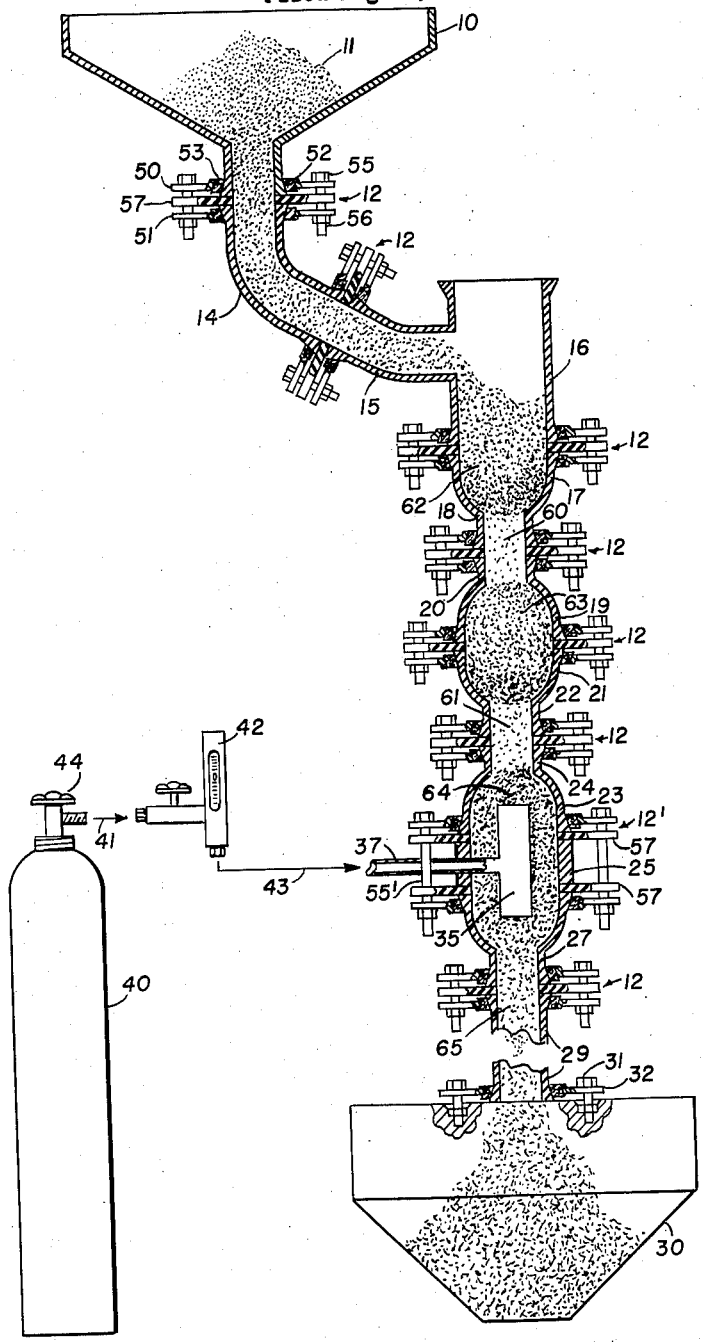
INVENTOR.
JOHN M. FOGELBERG
BY
ATTORNEY

2,830,911

METHOD OF DEOXYGENATING POTATO GRANULES AND THE LIKE

John M. Fogelberg, Rochester, N. Y., assignor to The R. T. French Company, Rochester, N. Y., a corporation of Delaware Application August 3, 1955, Serial No. 526,277

6 Claims. (Cl. 99—189)

The present invention relates to a method for treating granular material by means of a gas, and in a more specific aspect to a method and apparatus for deoxygenating granular food products such as potato granules.

Various dehydrated, granular food products have been placed on the market within the last few years. For instance the housewife can buy a dehydrated, granular potato product, add water or milk and make mashed potatoes; or she can buy dehydrated milk granules, add water and have liquid milk; etc. To prevent rapid deterioration of these granular food products, the granules must be deoxygenated before the product is packaged. For this purpose they are "washed" with nitrogen gas.

In some cases this is done by putting the granular material into vacuum chambers, evacuating the chamber, and filling it with nitrogen. Ordinarily two vacuum chambers are used, one being filled with the powder or granules to be treated, and the other chamber being emptied while the first is being filled. This procedure is expensive to operate, cumbersome, and slow. Vacuum pumps must be employed; and heavy-walled chambers are required to withstand the outside atmospheric pressure when the chambers are evacuated.

For these reasons simpler procedures have been sought. In deoxygenating potato granules it has been the practice, for instance, to flow the granules slowly by gravity through a pipe, the rate of flow being controlled by a slide gate at the bottom of the pipe, and nitrogen has been admitted by means of a small tube into the lower half of the pipe and flowed counter-currently through the descending potato granules, the nitrogen escaping at the top of the pipe. The drawback of this procedure is that if relatively small flows of gas are used, it is difficult to know whether the entire stream of potato granules is being "washed" uniformly as the granules descend through the pipe; and if higher rates of nitrogen flow are used, the potato granules in the pipe "fluidize" and the granules flow out the bottom and the top of the pipe at abnormal rates. If the granules "fluidize," they lose their normal solid properties and assume the properties of a liquid. Hence it is difficult to contain the granules in a piece of equipment. Another disadvantage of fluidization, as heretofore practiced, is that it brings about very rapid mixing of the gases and the solid particles so that there can be no progressive washing of the granules as the material proceeds through the system. The big drawback of the prior counterflow procedure, therefore, is that there is no assurance that treatment of the granules is uniform. There is no control preventing admixing of untreated solids with treated solids.

A primary object of the present invention is to provide a method for deoxygenating potato granules which will be more efficient, and which will produce more uniform results than the method heretofore employed.

Another object of the invention is to provide a method which may be employed in the treatment of granular material of various kinds by gases for various purposes, particularly for "gas-washing" such granular material.

Other objects of the invention will be apparent hereinafter from the specification and from the recital of the appended claims.

In the drawing, the figure is a somewhat diagrammatic, vertical sectional view illustrating a preferred embodiment of apparatus constructed according to the present invention for practicing the process of the present invention.

The apparatus shown in the drawing embodies a plurality of duct sections of narrow bore alternating with duct sections of wider bore. The potato granules, or other product to be treated, descend through the alternating wide and narrow sections of the duct by gravity. The nitrogen, or other treating gas, is supplied into the duct adjacent the lower end of the duct and flows counter to the flow of the potato granules. The duct is connected at the bottom to a hopper from which the granules are loaded into packages for shipment. Fluidization is achieved in the constricted sections above the point of entry of the gas while normal flow is retained through the sections of wider bore.

Referring now to the drawing by numerals of reference, 10 denotes a supply hopper into which granules, which are to be treated, are dumped. These granules are denoted at 11. The hopper 10 is connected at its bottom by a conventional air-tight connection, denoted generally at 12, with a tubular elbow 14, which in turn is connected by another conventional coupling 12 with the tubular arm or elbow 15 of a tubular pipe section 16. The tubular pipe section 16 is connected by another conventional connection 12 with a tubular pipe section 17 which at its top is of substantially the same diameter as the diameter of the tubular pipe section 16, but which is of reduced diameter adjacent its lower end. This pipe section 17 is connected at its lower end, by another conventional connection 12, to a tubular pipe section 19. The pipe section 17 has a portion 18 adjacent its lower end which is of reduced bore diameter. The pipe section 19 has a portion 20 at its upper end which is of the same bore diameter as portion 18 of pipe section 17; and the pipe section 19 is of enlarged bore diameter adjacent its lower end. The pipe section 19 may, in fact, be identical with the section 17, but inverted with reference to the pipe section 17, so that its smaller diameter portion is at its upper end. The pipe section 19, in turn, is connected by another conventional coupling 12 to a pipe section 21, which may be identical in structure with pipe sections 17 and 19, but having its larger diameter portion at its upper end adjoining the larger diameter portion at the lower end of the pipe section 19. The pipe section 21 has a portion of smaller diameter at its lower end 22. This pipe section is connected by another conventional coupling 12 to a pipe section 23 which is inverted with reference to the pipe section 21 so that it has its smaller diameter portion 24 at its upper end adjoining the smaller diameter portion 22 of the pipe section 21.

The inverted pipe section 23 is connected by another conventional coupling 12' with a tubular section 25 whose bore is of uniform diameter from end to end, and of a diameter equal to the diameter of larger diameter bore portion of pipe section 23. The section 25, in turn, is connected by the last-named coupling 12' with a pipe section 27 which is of reduced diameter, at its lower end. The pipe section 27 is connected by another conventional coupling 12 with a pipe section 29 that is of uniform bore diameter throughout its length, and whose bore diameter is equal to that of the reduced diameter bore portion of pipe section 27. The section 29 is connected by a coupling plate 32 and bolts 31 with a hopper 30 that acts as a filling hopper for the packages which are to be filled with the treated granular product.

For deoxygenating potato granules, there is mounted in the tubular section 25 a nitrogen diffuser 35 which may be in the form of a perforated head that is connected in any suitable fashion to a nitrogen supply pipe 37. Nitrogen may be supplied to this pipe from a nitrogen tank 40 which is connected by piping, indicated diagrammatically by the arrow 41, with an automatic control 42 for the rate of flow of the nitrogen. This flow-rater 42 is connected, in turn, by piping, indicated diagrammatically by the arrow 43, with the pipe 37. The tank 40 is provided with the conventional manual valve 44 for opening it or shutting it off.

Each of the couplings 12 may comprise two plates 50 and 51, having annular flanges 52 which have internal conical bores corresponding to the conical peripheral surfaces at the abutting ends of the pipe sections which are to be connected by the coupling. The bores of the coupling plates 50 and 51 have rubber or other suitable packing material 53 in them to grip the conical peripheral portions of the coupled pipe sections. The two plates 50 and 51 of a coupling are drawn together by bolts 55 and nuts 56. Rubber or other suitable gaskets 57 are mounted between the adjacent faces of the pipe sections to effect proper sealed connection between the pipe sections.

The coupling 12' is similar to that described except that it has two spaced gaskets 57 and elongated bolts 55' to couple together simultaneously the two pipe sections 23 and 27 and the intermediate pipe section 25.

In operation, the nitrogen gas admitted to the pipe section 25 through the diffuser 35 rises through the column of pipe sections causing fluidization of the potato granules in the constricted areas formed by adjoining narrow portions 24 and 22, and 20 and 18 of the duct. The wider portions of the pipe sections 23, 21, 19, 17 and 16 are wide enough compared to the rate of flow of the nitrogen that the granules will not be fluidized as they flow through them. The treated potato granules can be withdrawn slowly from the bottom of the tube 29, allowing the granules to flow slowly counter-currently to the nitrogen supply. In other words, fluidization is maintained at the constricted areas 60 and 61 while a smooth, steady flow takes place through the expanded areas 62, 63, 64. Thus, multiple step fluidization is achieved.

With this procedure and apparatus the oxygen or air can be effectively washed out of the potato granules at a rate sufficient to take care of a packaging machine or machines. It is preferred to make the pipe sections of transparent material such as "Pyrex" glass so that the action within the piping can be observed, and so as to permit ready cleaning of the piping.

By making the tube of several reducer sections such as are ordinarily used to connect one size pipe with a section of pipe of different size, a convenient quickly assembled, inexpensive structure is possible. The reducers for fluidizing potato granules have been found to act satisfactorily when they have a maximum bore diameter of four inches and a minimum bore diameter of two inches. With this structure, the oxygen or air can be flushed out of the potato granules with a minimum requirement of nitrogen gas. In the first fluidized area 60, formed by the adjoining small portions 18 and 20 of the pipe sections 17 and 19, perhaps 90% of the oxygen can be eliminated. In the second fluidized area 61, formed by the adjoining small diameter portions 22 and 24 of the pipe sections 21 and 23, perhaps another 90% of the remaining 10% of oxygen can be eliminated. If desired, other fluidizing sections can be added. In the narrow fluidizing sections the potato granules are tossed around and washed thoroughly with the nitrogen, whereas in the sections of larger diameter there is more or less quiescent flow of the granules.

The larger diameter portion of pipe section 17 and the pipe section 16 which is also of large bore diameter together constitute a quiescent section 62 above fluidizing section 60, preventing the fluidized granules from "boiling over" out of the top of pipe section 16. The smaller diameter portion of pipe section 27, and the long narrow diameter bored pipe section 29 together constitute a quiescent section 65 below the diffusing chamber 25 allowing quite down flow of the granules to the loading hopper 30. The pipe section 16 may be capped with fine mesh screen, and is open to atmosphere.

A product, such as potato granules, is almost ideal for treatment with apparatus such as described. There are other products, however, for which this type of operation might also be suitable. In any operation, where it is desired to contact a granular or powdered solid with a gas in a continuous, yet discrete, step-wise fashion the process outlined above should be applicable. For example, the process may be used in deoxygenating milk granules, as previously stated, in the sterilization of seeds, in the cooling or drying of granular material by cold or hot air, respectively, in the treating of solid catalysts in the petroleum and chemical industries by multiple step fluidization, etc.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. The method of deoxygenating a granular food product by contact of the food product with an inert gas which comprises effecting gravity flow of the product while counterflowing an inert gas through the product, the rate of counterflow of the gas through the product being such that, during such gravity flow and counterflow, the product is subjected to a plurality of stages of fluidization and to a plurality of stages of quiescent flow, the stages of fluidization alternating individually with the stages of quiescent flow, the stages of fluidization and quiescent flow being connected directly to one another so that the product passes directly from a stage of quiescent flow to a stage of fluidization and vice versa.

2. The method of deoxygenating a granular food product by contact of the food product with a gas which comprises subjecting the product to a plurality of stages of fluidization alternating with a plurality of stages of quiescent flow, by effecting gravity flow of the product continuously through a plurality of successive alternating zones of small and large cross-sectional areas, respectively, while counterflowing an inert gas continuously through the product at a rate such as to fluidize the product only in the zones of small area while the product flows quiescently in the zones of large area, the zones of large area serving to separate the zones of small area from one another.

3. The method of deoxygenating a granular food product according to claim 2 in which the product is fed into the successive zones at a rate such as to completely permeate all said zones.

4. The method of deoxygenating a granular food product which comprises subjecting the product in the presence of nitrogen gas to a plurality of stages of fluidization alternating with a plurality of stages of quiescent flow, by effecting gravity flow of the granular product continuously through a plurality of successive alternating zones of small and large cross-sectional areas, respectively, while counterflowing nitrogen gas continuously through the granular food product at a rate such as to fluidize the product in the zones of small area while the product flows quiescently in the zones of large area.

5. The method of deoxygenating a granular food product as claimed in claim 4 in which the granular food product is fed into the successive zones at a rate such as to completely permeate said zones.

6. The method of deoxygenating potato granules, which comprises effecting continuous gravity flow of the granules through a plurality of successive alternating zones of small and large cross-sectional areas, respectively, while counterflowing nitrogen gas continuously through the falling granules at a rate such as to fluidize the product only in the zones of small area while the product flows quiescently in the zones of large area, the rate of gravity feed of the granules into the successive zones being such that the granules completely permeate said zones.

References Cited in the file of this patent

UNITED STATES PATENTS

| | | |
|---|---|---|
| 735,878 | Hutton | Aug. 11, 1903 |
| 1,459,326 | Dow | June 19, 1923 |
| 2,335,192 | Moore | Nov. 23, 1943 |
| 2,541,441 | Sharp | Feb. 13, 1951 |
| 2,688,195 | Hyer | Sept. 7, 1954 |